United States Patent

Sokn et al.

[11] Patent Number: 5,133,617
[45] Date of Patent: Jul. 28, 1992

[54] MOTOR MOUNT ASSEMBLY

[75] Inventors: Erick L. Sokn, Carbondale; W. Michael Tompkins, Carterville, both of Ill.

[73] Assignee: Maytag Corporation, Newton, Iowa

[21] Appl. No.: 722,212

[22] Filed: Jun. 27, 1991

[51] Int. Cl.⁵ ............................................. B25G 3/16
[52] U.S. Cl. .................................. 403/349; 403/348; 403/343
[58] Field of Search ................... 403/348, 349, 343

[56] References Cited

U.S. PATENT DOCUMENTS

| | | |
|---|---|---|
| 2,645,438 | 7/1953 | Kalikow ..................... 403/348 X |
| 2,743,412 | 4/1956 | McLean . | 
| 2,903,209 | 9/1959 | Strub . |
| 3,143,284 | 8/1964 | Lindsjo et al. . |
| 3,508,729 | 4/1970 | Wilson . |
| 3,509,393 | 4/1970 | Roddy . |
| 4,625,134 | 1/1986 | Weaver . |
| 4,756,638 | 7/1988 | Neyret ............................ 403/349 |
| 4,864,683 | 9/1989 | Herron, Jr. et al. . |
| 4,917,581 | 4/1990 | Richardson, Jr. et al. . |

Primary Examiner—Andrew V. Kundrat
Attorney, Agent, or Firm—Bacon & Thomas

[57] ABSTRACT

An electric fan motor of a domestic clothes dryer is directly mounted to an associated plastic fan housing through an interlocking connection between a composite mounting ring of the motor and a cylindrical socket integrally formed with the housing to provide a precise alignment between the motor and the housing.

4 Claims, 4 Drawing Sheets

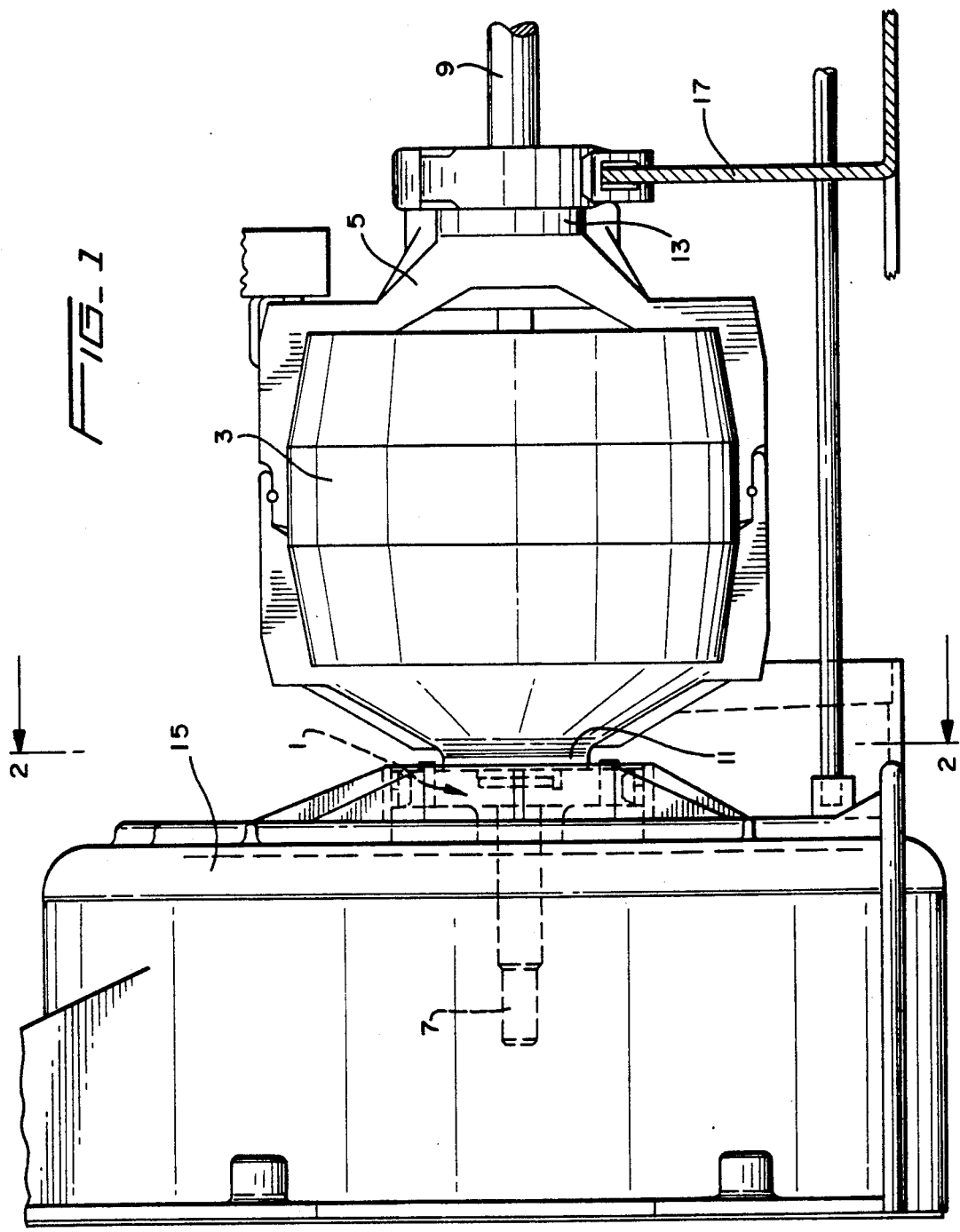

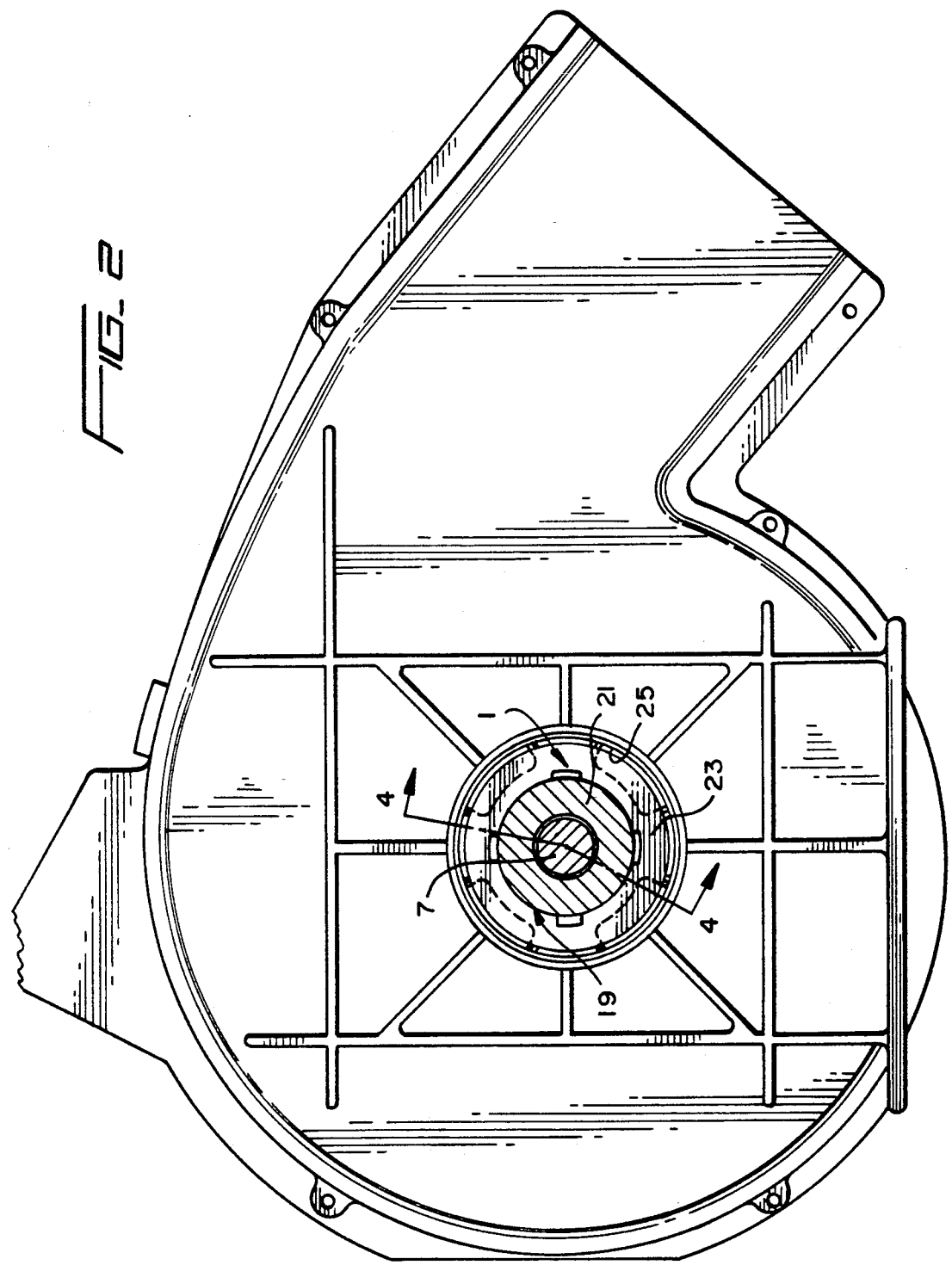

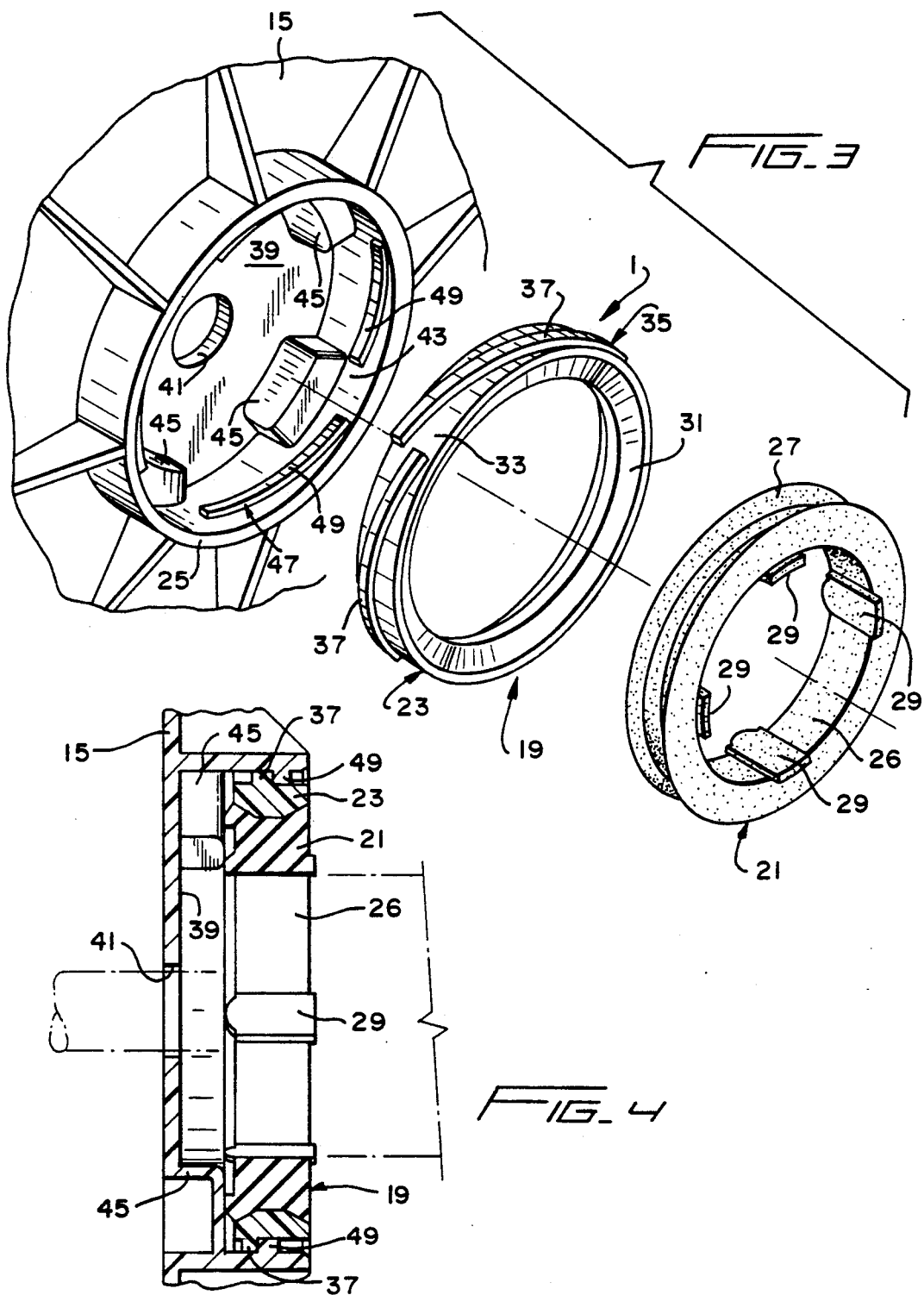

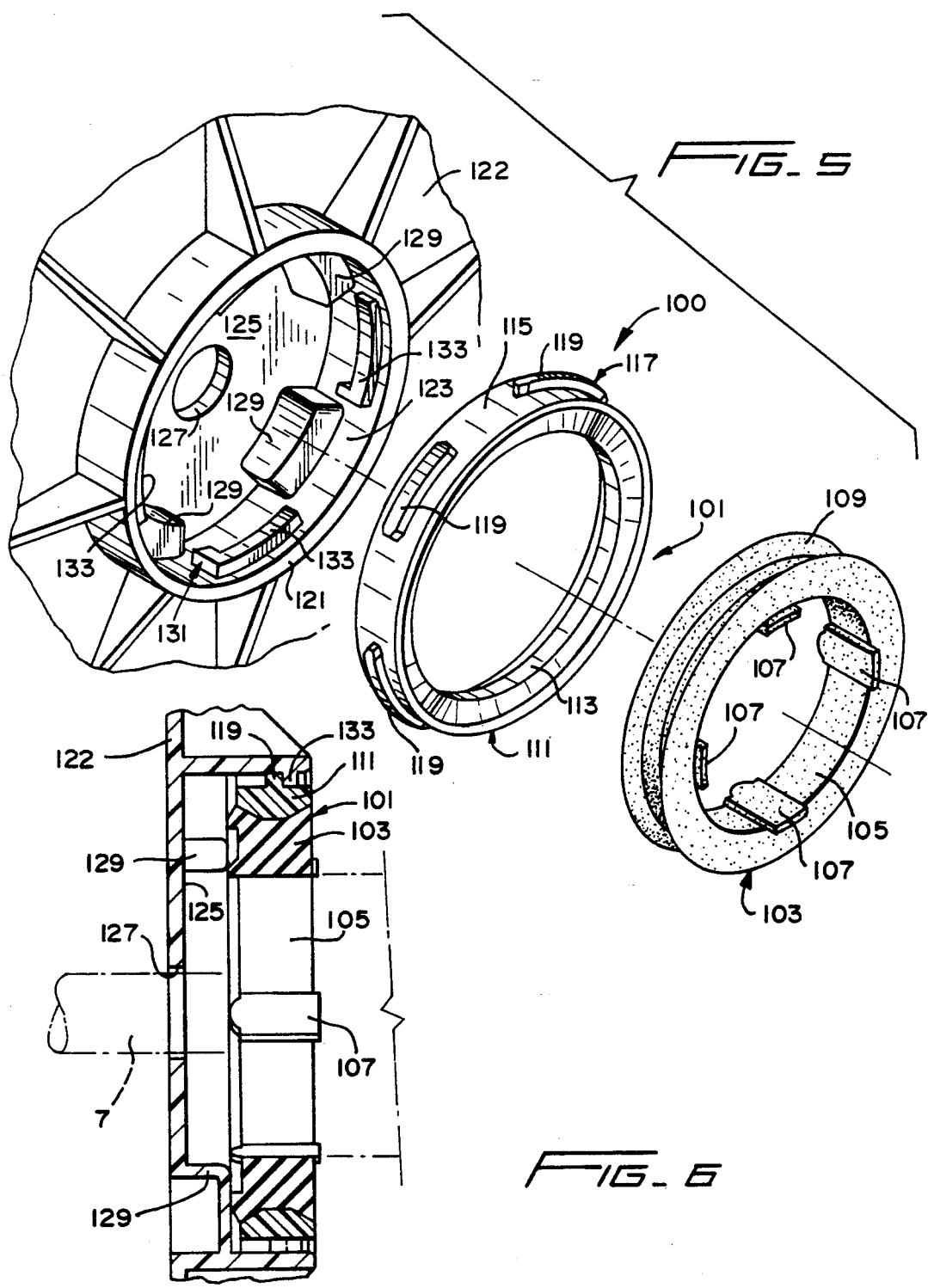

MOTOR MOUNT ASSEMBLY

BACKGROUND OF THE INVENTION

1. Field of the Invention

The present invention generally involves the field of technology pertaining to devices for mounting or supporting electric motors relative to an associated structure. More particularly, the invention relates to an improved assembly for mounting a fan motor to the fan housing of a domestic clothes dryer.

2. Description of the Prior Art

An electric motor for rotating a fan blade is generally defined by a motor body having an end shield provided with a central outwardly projecting cylindrical hub from which the power output shaft of the motor coaxially extends. A second hub is provided at the opposite end of the motor if two power output shafts are required. In order to support the motor for operation, the hub may be provided with a mounting ring assembly comprised of a rigid outer ring and a resilient inner ring, with the ring assembly being in turn secured by a clamp to a sheet metal support. The resilient inner ring serves to dampen and absorb vibration created by the motor during its operation.

When the motor is used to drive a fan blade mounted on its power output shaft, the shaft of the motor and the fan blade are disposed within an associated fan housing. Since conventional practice usually provides independent support for the housing and motor assembly, it is very difficult to achieve a precise alignment between the motor and the housing. This situation often results in both misalignment and the lack of a positive engagement between the motor and the housing, thereby also causing the fan blade to impact against the interior wall of the housing. This problem is particularly prevalent in ventilation systems wherein maximum efficiency of fan operation requires a minimum clearance between the periphery of the fan blade and the adjacent interior wall portions of the housing. Known structures for mounting a motor relative to an associated housing have also been expensive to manufacture and time consuming to assemble.

SUMMARY OF THE INVENTION

It is an object of the present invention to provide an improved assembly for mounting an electric fan motor relative to an associated fan housing.

It is another object of the invention to provide an assembly for directly mounting a motor having a fan blade to a fan housing in order to realize a precise alignment between the motor and housing, thereby reducing the possibility of the fan blade impacting against the housing and affording efficient fan operation.

It is a further object of the invention to provide an improved assembly for mounting a motor to an associated housing wherein the assembly is economical to manufacture and easy to utilize.

The foregoing and other objects of the invention are realized by providing a motor mount assembly which includes a composite mounting ring assembly defined by an external rigid ring and an internal resilient ring disposed in coaxial alignment with each other. The ring assembly is secured to the hub of a conventional motor. The outer periphery of the external ring is provided with a first engagement portion for connection to a cooperating second engagement portion provided on the inner wall of a cylindrical socket carried by the fan housing. The socket includes an aperture through which the motor shaft is inserted for disposition within the housing to support a fan blade on the end of a shaft. Direct mounting of the motor to the housing is achieved by inserting the ring assembly into the cylindrical socket and rotating the motor relative to the housing, thereby causing the first and second engagement portions to be disposed in interlocking connection with each other and precisely align the motor relative to the housing. The first and second engagement portions may comprise corresponding portions of a threaded joint or a bayonet type joint connection.

Other objects, features and advantages of the invention shall become apparent from the following detailed description of preferred embodiments thereof, when taken in conjunction with the drawings wherein like reference characters refer to corresponding parts in the several views.

BRIEF DESCRIPTION OF THE DRAWINGS

FIG. 1 is a front elevational view of a fan motor shown mounted to an associated fan housing by a motor mount assembly according to a first preferred embodiment of the invention;

FIG. 2 is a cross-sectional view taken along the line 2—2 of FIG. 1;

FIG. 3 is a partial exploded perspective view showing the details of the mounting ring assembly and the cylindrical socket carried by the fan housing of the first preferred embodiment;

FIG. 4 is a cross-sectional view taken along the line 4—4 of FIG. 1;

FIG. 5 is a partial exploded view showing a motor mount assembly according to a second preferred embodiment of the invention; and FIG. 6 is a cross-sectional view of the second preferred embodiment similar to that shown for the first preferred embodiment in FIG. 4.

DETAILED DESCRIPTION OF THE PREFERRED EMBODIMENTS

A motor mount assembly 1, according to a first preferred embodiment of the invention, shall now be described with initial reference to FIGS. 1 and 2. As shown therein, a conventional electric motor 3 is provided with a support clamp 5 thereon. Motor 3 includes a pair of oppositely directed power output shafts 7 and 9. Shaft 7 extends coaxially and outwardly from a first hub 11, and shaft 9 extends coaxially and outwardly from a second hub 13 of motor 3. Assembly 1 is mounted onto hub 11 and serves to directly mount the corresponding end of motor 3 to an associated fan housing 15. As particularly shown in FIG. 1, the end of shaft 7 is disposed within housing 15 for mounting an appropriate fan blade thereon. The opposite end of motor 3 is mounted on a conventional sheet metal support structure 17.

With particular reference to FIG. 2, motor mount assembly 1 includes a mounting ring assembly 19 comprised of an internal ring 21 that is concentrically supported within an external ring 23. Mount assembly 1 is in turn secured within a cylindrical socket 25 carried by housing 15. In the arrangement depicted, housing 15 and cylindrical socket 25 may be integrally formed of plastic material and serve as the fan housing of a domestic clothes dryer. In such application, shaft 7 of motor 3 will support the fan blade for circulating hot air through the clothes basket of the dryer, while shaft 9 of motor 3 will be provided with an appropriate pulley for driving a belt to rotate the clothes basket.

The details of motor mount assembly 1 shall now be described with reference to FIGS. 3 and 4. As shown, internal ring 21 is preferably integrally formed from a resilient material, such as rubber, capable of absorbing and dampening the transmission of torsional and radial vibrations normally realized from the operation of motor 3. Ring 21 includes an inner peripheral surface 26 and an outer peripheral surface 27. A plurality of axially extending tabs 29 are circumferentially spaced around inner peripheral surface 26 to permit ring 21 to be mounted directly onto hub 11 of motor 3 in a conventional manner.

External ring 23 is preferably formed of rigid material, such as fiberglass reinforced nylon, and also includes an inner peripheral surface 31 and an outer peripheral surface 33. As more apparent from FIG. 4, outer peripheral surface 27 of ring 21 is of opposite corresponding configuration to inner peripheral surface 31 of ring 23, thus permitting ring 21 to be coaxially positioned within ring 19 and dispose surfaces 27 and 31 in conforming abutting engagement with each other. Mounting ring assembly 19 is preferably produced by insert molding external ring 23 to internal ring 21 in a conventional molding procedure.

As further indicated in FIG. 3, outer peripheral surface 33 of external ring 23 is provided with a first engagement portion 35 in the form of a raised helical thread defined by a plurality of circumferentially spaced thread segments 37. It is preferred that four segments 37 be provided and equally spaced 90° from each other around surface 33.

As also seen in FIG. 3, cylindrical socket 25 of housing 15 is preferably integrally molded with housing 15 and includes a bottom wall 39 provided with a central circular aperture 41 therein for receiving shaft 7 of motor 3 therethrough during mounting of motor 3 to housing 15. Socket 25 includes an inner cylindrical surface 43 and a plurality of stop members 45 equally and circumferentially spaced around surface 43. Members 45 are also preferably integrally molded with housing 15 and positioned rearwardly of cylindrical surface 43 adjacent bottom wall 39. A second engagement portion 47 having a thread configuration corresponding to that of first engagement portion 35 is provided on surface 43 and positioned forwardly of stop members 45. Portion 47 is defined by four corresponding thread segments 49 which extend inwardly from surface 43 and are equally and circumferentially spaced 90° around surface 43. Segments 49 are also spaced forwardly of stop members 45. Through this arrangement, a large and easily alignable target area is established between mounting ring assembly 19 and socket 25 so that ring assembly 19 may be easily aligned and inserted within socket 25. When this is accomplished, rotation of ring assembly 19 90° with respect to socket 25 results in a secure and aligned interlock connection therebetween, as clearly shown in FIG. 4. In this position, ring assembly 19 is disposed in abutting engagement against stop members 45, thus assuring a secure attachment between ring assembly 19 and socket 25 which will not become accidentally loosened or disconnected during operation of motor 3.

It is of course possible to configure first and second engagement portions 35 and 47, and also stop members 45, in order to provide a predetermined orientation for the engagement and interlock connection between ring assembly 19 and socket 24, and also an interference fit therebetween for further assuring precise alignment and a secure direct attachment of motor 3 to housing 15.

A second preferred embodiment of the invention shall now be described with reference to FIGS. 5 and 6. In this case, a motor mount assembly 100 also includes a mounting ring assembly 101 comprised of an internal resilient ring 103 formed of the same material and having the same structural characteristics as internal ring 21 of mount assembly 1. Ring 103 includes an inner peripheral surface 105, a plurality of axially extending tabs circumferentially spaced around surface 105, and an outer peripheral surface 109. Ring assembly 101 also includes an external ring 111 formed of the same material and having the same structural characteristics as external ring 23 of mount assembly 1. In this case, ring 111 also has an inner peripheral surface 113, an outer peripheral surface 115 and a first engagement portion 117. Engagement portion 117 is defined by a plurality of elongate tabs 119 which extend outwardly from and are equally spaced circumferentially around peripheral surface 115. Ring 111 may also be insert molded to ring 103 to form ring assembly 101 for attachment to hub 11 of motor 3 in the same manner as previously described for mount assembly 1.

Mount assembly 100 further includes a cylindrical socket 121 that is also preferably integrally molded of plastic with an associated fan housing 122. Socket 121 includes a cylindrical inner surface 123 and a bottom wall 125 provided with a central circular aperture 127 formed therein for freely receiving the end of motor shaft 7 therethrough. Inner surface 123 further includes a plurality of spaced stop members 129 positioned rearwardly thereof adjacent bottom wall 125 in the same manner as stop members 45 of mount assembly 1. Socket 121 includes a second engagement portion 131 defined by a plurality of substantially L-shaped tabs 133 extending inwardly from and equally spaced circumferentially around inner surface 123. By appropriate positioning and spacing of tabs 133 axially and circumferentially with respect to stop members 129, it is apparent that a tight interlock connection may be realized when ring assembly 101 is inserted within socket 121 and rotated with respect thereto. First and second engagement portions 117 and 131 are preferably configured so that an interlock connection between ring assembly 101 and socket 123 may be realized through a 90° relative rotation therebetween. Engagement portions 117 and 131 essentially define a bayonet type joint connection. As in the case of mount assembly 1, a tight interference engagement may also be formed between ring assembly 101 and socket 121 by appropriately configuring the size, number and location of tabs 119, 133 and stop members 129.

The direct connection of a fan motor to an associated fan housing through a motor mount assembly of the present invention shall now be described with reference to mount assembly 1 and FIGS. 1-4 of the first preferred embodiment. This is accomplished by first forming mounting ring assembly 19 and attaching internal ring 21 thereof to hub 11 of motor 3 in a conventional manner. Thereafter, the end of shaft 7 of motor 3 is inserted through central aperture 41 of cylindrical socket 25 to position ring assembly 19 within the forward end of socket 25. This provides initial alignment of first and second engagement portions 35 and 47. Finally, motor 3 is rotated relative to housing 15 to provide a full interlock connection between thread segments 37 and 49 of engagement portions 35 and 47, thus resulting in a secure and aligned direct attachment of motor 3 to housing 15. This alignment permits a fan blade mounted on the end of shaft 7 to rotate freely within housing 15 and avoid impact therewith during operation of motor 3. This same direct attachment procedure is also followed for mount assembly 100 of the second preferred embodiment.

Though the invention has been described as being utilized in the fan system of a domestic clothes dryer, it is of course understood that the invention may also be utilized in any other similar environment wherein a precise alignment between a motor and an associated housing is desired. For example, heating, ventilatin and air conditioning systems may clearly utilize the invention to distinct advantage in order to realize a minimum clearance between the periphery of a blower or fan blade and the internal adjacent wall portions of the housing in order to achieve maximum operating efficiency. Thus, the invention resides in an improved motor mount assembly which permits a direct and secure attachment of a motor to an associated housing in order to realize a precise alignment therebetween.

It is to be further understood that the different forms and configurations of the invention as shown and described herein are to be taken as preferred embodiments thereof, and that various changes in shape, material, size and arrangement of parts may be resorted to without departing from the spirit of the invention or the scope of the subjoined claims.

We claim:

1. A motor mount assembly for directly attaching an electric fan motor of the type having a power output shaft extending outwardly from a hub thereof to a fan housing, the assembly comprising:
   a) a mounting ring assembly for attachment to a hub of an electric motor, the ring assembly including an outer peripheral surface, an external ring formed of a substantially rigid material and an internal ring formed of a substantially resilient material, the internal ring being coaxially secured within the external ring;
   b) a first engagement portion provided on the outer peripheral surface of the ring assembly;
   c) a cylindrical socket for attachment to a fan housing, the socket including an inner cylindrical surface and a second engagement portion on the inner cylindrical surface; and
   d) the first and second engagement portions being correspondingly engageable to form an interlock therebetween upon relative rotation of the mounting ring assembly with respect to the cylindrical socket.

2. The motor mount assembly of claim 1 wherein:
   a) the first engagement portion is in the configuration of a first helical thread extending circumferentially around the outer peripheral surface of the ring assembly;
   b) the second engagement portion includes a second helical thread extending circumferentially around the inner cylindrical surface; and
   c) stop means disposed within the socket and engageable by the ring assembly when the first and second threads are rotated into full threaded engagement with each other.

3. The motor mount assembly of claim 2 wherein each of the first and second threads is defined by four thread segments spaced equally around the respective outer peripheral surface and inner cylindrical surface to permit a full thread engagement therebetween upon a 90° rotation of the ring assembly relative to the cylindrical socket.

4. The motor mount assembly of claim 1 wherein:
   a) the first engagement portion includes a plurality of elongate tabs extending circumferntially around the outer peripheral surface of the external ring;
   b) the second engagement portion includes a plurality of substantially L-shaped tabs circumferentially around the inner cylindrical surface; and
   c) stop means disposed within the socket and engageable by the ring assembly when the ring assembly is rotated relative to the socket to dispose the elongate tabs in full engagement with the L-shaped tabs.

* * * * *